March 19, 1957 H. A. TOULMIN, JR 2,785,440
METHOD OF MANUFACTURING CUSHIONS
Filed Oct. 26, 1951 2 Sheets-Sheet 1

INVENTOR
HARRY A. TOULMIN, Jr
BY Toulmin & Toulmin
ATTORNEYS

March 19, 1957          H. A. TOULMIN, JR                    2,785,440
                  METHOD OF MANUFACTURING CUSHIONS
Filed Oct. 26, 1951                                    2 Sheets-Sheet 2

INVENTOR
HARRY A. TOULMIN, Jr.
BY *Toulmin & Toulmin*
ATTORNEYS

United States Patent Office 2,785,440
Patented Mar. 19, 1957

2,785,440

METHOD OF MANUFACTURING CUSHIONS

Harry A. Toulmin, Jr., Dayton, Ohio, assignor to The Commonwealth Engineering Company of Ohio, Dayton, Ohio, a corporation of Ohio Application October 26, 1951, Serial No. 253,290

2 Claims. (Cl. 18—53)

This invention relates to an improved method for manufacturing the cushion.

The customary manner of making automobile seat cushions is to provide a frame within which are arranged either box springs or serpentine springs, and which are covered with padding and a suitable fabric.

More recently, cushions have been made of a sponge rubber, and it is in connection with this improved type cushion that the present invention deals.

A primary object of the present invention is to provide an improved method of making cushions for automobiles and the like utilizing sponge rubber in the manufacture.

Another object is the provision of a method of manufacturing a cushion for automobiles and the like formed at least partly of sponge rubber.

A still further object is the provision of a method of manufacturing the same wherein a substantial portion of the bulk of the cushion is made up of springs.

These and other objects and advantages will become more apparent upon reference to the following description taken in connection with the accompanying drawings, in which.

Figure 1:
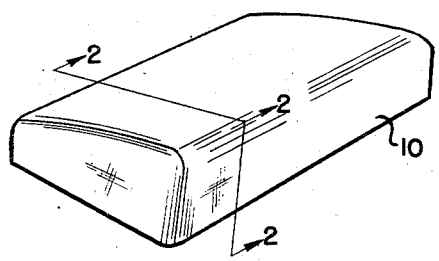
Figure 1 is a perspective view of a typical seat cushion manufactured according to my invention.
Figure 2:
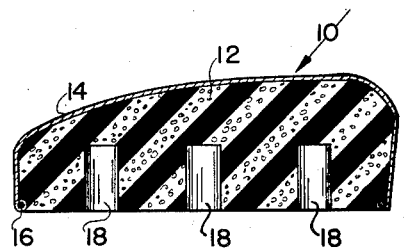
Figure 2 is a transverse section indicated by line 2—2—2 on Figure 1.

Referring to the drawings somewhat more in detail, the cushion 10 shown in Figure 1 may comprise, as will be seen in Figure 2, a main body part 12 of sponge rubber having thereover a fabric covering 14, and which covering has its margin engaging a stiffening wire 16 extending around the periphery of the cushion at its lower edge. In order to provide for the proper yield in the body of the cushion there may be provided the recesses 18 extending upwardly from the lower surface. The particular size and number of these recesses can best be determined by test and experiment, and it will be understood that they are generally distributed over the entire area of the cushion.

The sponge rubber forming the main part of the body of the cushion can be arrived at in a number of ways, but the preferred manner according to this invention is to foam a rubber latex, either natural or synthetic, by the introduction therein of an inert gas, preferably nitrous oxide, while subjecting the latex to agitation.

Various additives may be used to this mixture, such as coagulants and vulcanizers, so that upon the application of heat a stable vulcanized foam is produced.

Figure 4:
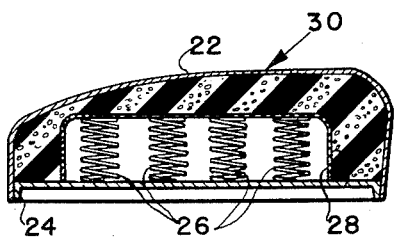
Figure 4 is a view like Figure 2, but showing how a substantial part of the sponge rubber can be displaced by a box spring arrangement.
Figure 3:
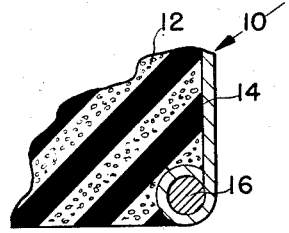
Figure 3 is an enlarged fragmentary view taken at the lower edge of the seat cushion of Figure 2 showing the stiffening wire extending about the cushion.

In Figure 4 there is shown an arrangement wherein the cushion 20 comprises an outer fabric layer 22, as described in connection with Figure 2, but which has framing 24 about and across the bottom of the cushion, and which supports the box spring arrangement, including the springs 26 and a fabric covering 28 thereover. The remainder of the body of the cushion is formed of the sponge rubber, represented at 30.

By the Figure 4 arrangement, the resilient characteristics of the cushion can be controlled by controlling the nature of the box spring insert with the foam rubber filling the spaces about the said insert and providing for the resilient surface of the cushion which is not directly influenced by the nature of the said box spring insert.

Figure 5:
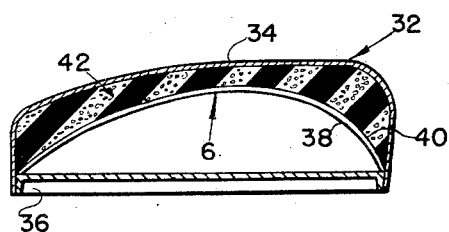
Figure 5 is a view like Figure 4, but shows the use of arched serpentine springs in the place of box springs.

In Figure 5, the cushion 32 includes the outer fabric covering 34 and the framing 36 about the lower part and between the opposite edges of which extend the arched serpentine springs 38 covered by the fabric layer 40. The sponge rubber in Figure 5 is represented by numeral 42. The Figure 5 arrangement is quite similar to the one illustrated in Figure 4, but offers the advantage of simpler manufacture, and is somewhat more inexpensive to manufacture because of the cheaper springs employed. Further, the overall height of the cushion of Figure 5 can be made somewhat less than the one illustrated in Figure 4.

Figure 6:
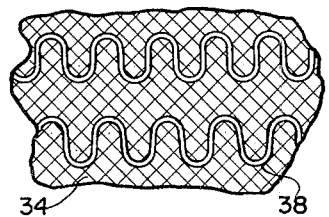
Figure 6 is a view looking in the direction of arrow 6 on Figure 5, showing how the serpentine springs are covered with a fabric layer.

It will be understood in connection with both of the cushion arrangements illustrated in Figures 5 and 6 that means would be provided for supplying the foam rubber to the space it is to occupy from the underneath side of the cushion.

Figure 7:
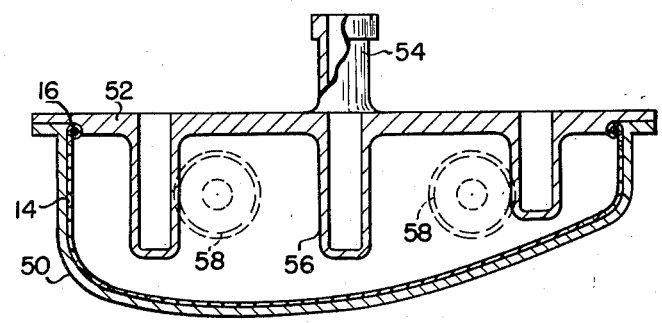
Figure 7 is a transverse sectional view showing one type of mold in which cushions are adapted for being manufactured according to this invention.

Turning now to Figures 7 through 10, there is illustrated therein the preferred type of mold in which the cushions are to be made and the apparatus through which the molds are processed during the manufacture of the cushion. The mold is illustrated in Figure 7 and comprises a main body part 50 and a cover member 52. The outer fabric covering 14 and stiffening wire 16 are adapted for being retained in the mold, as indicated in Figure 7. The cover plate 52 comprises one or more filling openings 54 through which the rubber foam is introduced into the mold cavity, and the cover plate may also comprise the parts 56 which serve to core out the recesses 18 on the underneath side of the cushion.

To permit easy conveying of the mold during the manufacture of the cushion, the mold may comprise roller means 58 at its opposite ends adapted for engaging any suitable sort of track or rail arrangement.

Figure 8:
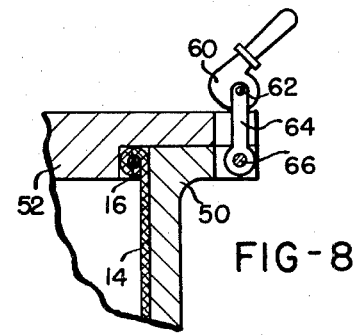
Figure 8 is a fragmentary view showing one type of cam lock for holding the two parts of the mold of Figure 7 together.

To permit pressure to be built-up within the cavity of the mold, the cover plate 52 may be adapted for being clamped to the body part 50 by one or more cam elements 60 pivotally mounted, as at 62, on the ends of studs or rods 64 pivoted, as at 66, on the body 50 of the mold. When these cam locks are latched in place, as shown in Figure 8, no amount of pressure within the mold cavity will cause them to loosen, but they can readily be unlocked manually or by cam means at any time desired.

Figure 9:
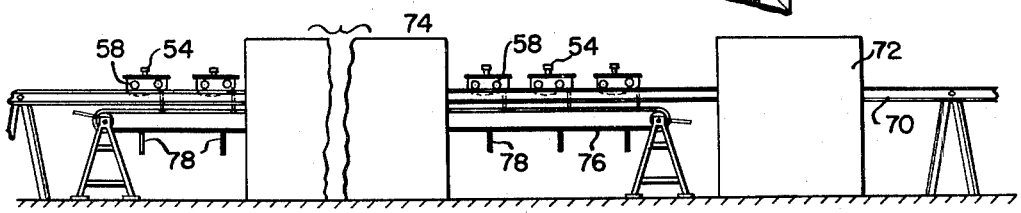
Figure 9 is a diagrammatic view showing the apparatus through which the molds are passed during the manufacture of the cushion.

In filling the molds, and thereafter curing the rubber therein, I use an arrangement diagrammatically illustrated in Figure 9, which includes tracks or rails 70 on which the molds are supported by means of the rolls 58, and which tracks extend through a filling station 72 where the molds are filled and through an oven 74 where heat is supplied to the molds at the proper temperature and for the proper duration to cure the rubber foam. For example, a temperature of 250° F. for a period of time up to about two hours has been found sufficient for effecting the complete cure of the sponge rubber referred to.

There may advantageously be provided the pusher arrangement represented by the endless element 76, having pusher members 78 thereon, by means of which the molds are pushed through the oven at the proper speed to insure curing of the foam rubber therein.

After the molds emerge from the oven, they may be permitted to cool to the point where they can be handled, and the completed cushion is then removed therefrom, with the only operation required to make them ready for use being a trimming operation to remove flash therefrom, which may be present through a slight overfilling of the mold or because of expansion of the foam rubber therein during curing.

Figure 10:
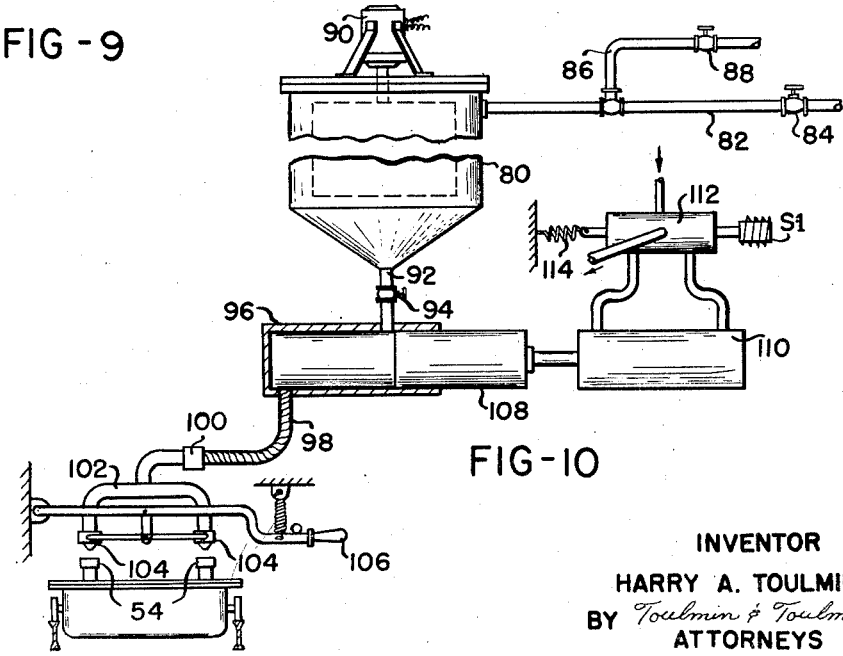
Figure 10 is a diagrammatic view showing details in connection with one arrangement for filling the said molds at the filling station of the arrangement shown in Figure 9.

The filling station at 72 may take any of a number of forms, and the one illustrated in Figure 10 is only exemplary of several that can be used. In Figure 10 there is a container 80 through which latex to be foamed is supplied through a conduit 82 having a valve 84. Another conduit 86 communicates with conduit 82 and is controlled by valve 88 and supplies the foaming gas to the latex as it enters container 80.

Container 80 includes an agitator member adapted for being driven by a motor 90, and this brings about an intimate admixing of the latex and foaming gas and initiates the foaming operation. The discharge 92 at the lower end of the container 80 may be controlled by a valve 84, so that the latex in container 80 may be maintained under pressure, if so desired. By maintaining the latex under pressure, it will be caused to expand at its point of delivery to the mold, and, in this manner, a container of reasonable size can serve to contain sufficient latex for filling a great many of the molds.

The latex can be delivered from the discharge of container 80 directly into the molds, or it may be metered or measured. One manner of measuring the latex is illustrated in Figure 10, where a discharge 92 is arranged to discharge into a cylinder 96 connected by a flexible conduit 98 with the inlet of a pressure responsive valve 100 that discharges into the branched conduit 102 having nozzles 104 adapted for engagement with the filler pipes 54 of the mold.

Nozzles 104 are connected with a lever arrangement 106 which can be depressed to bring the nozzles into proper engagement with the filler pipes, or released to separate the nozzles from the pipes.

A piston 108 is positioned in cylinder 96 and is adapted for reversible actuation by reversible motor 110 controlled by the four-way reversing valve 112 that may be actuated in one direction by a spring 114, and in another direction by a solenoid S1. By sizing chamber 96 properly, it can be filled with material from container 80, and then this material displaced through conduit 98, valve 100, and conduit 102 to the mold, and thus fill the mold to the desired degree.

It will be apparent that the Figure 10 arrangement will be rapid in operation and conserving of material. At the same time, the rubber to be foamed can be maintained under a certain pressure clear up to the time it is released into the mold cavity, and this will bring about the maximum expansion of the rubber foam within the mold cavity and reduce the problem in connection with introducing the material into the mold.

After the molds have been filled in the described manner, they are then conveyed through oven 74, and the material vulcanized.

Within the oven 74 any suitable heating means can be applied, such as hot gases, electric heaters, or infrared, or induction heating methods, and it will be understood that substantially equivalent results would obtain.

One variation which I contemplate as coming within the scope of my invention, would be to make the molds of glass or other materials, such as some of the hard rubbers, plastics, which are sufficiently strong physically to serve as the molds, but which are transparent to infrared radiation, thereby leading to a highly efficient heating of the rubber foam within the mold cavity when this type of mold is employed and the oven 74 comprises infrared radiators.

One of the advantages that obtains in connection with curing the rubber foam by infrared in the described manner is that there is a penetration of the rubber foam by the infrared rays which causes it to set-up quickly, thus preserving the random pattern of the bubbles of gas therein and preventing the upward migrations thereof, as sometimes occurs when the rubber foam must be heated by conduction through a metallic mold.

The feature referred to above of the quick setting of the rubber foam under the action of infrared radiation leads to the possibility of an initial cure of the rubber foam in the mold by the action of infrared radiation which will serve to at least partly solidify the rubber foam, and which would then enable a great many of the molds to be transferred at one time to a carrier and introduced into another type of oven for a prolonged heating in a more conventional manner.

A great many rubber compositions are satisfactory in connection with the practice of my invention and purely by way of illustration, the following compositions are given as examples:

I

Neoprene latex, an aqueous emulsion of neoprene
 rubber _____gms__ 100
Plasticizer, 30–1 (a vegetable oil)_____cc__ 1
Sensitizer, a 25% dispersion of sodium silico-
 fluoride _____cc__ 2.3

II

Natural latex, an aqueous dispersion of natural
 rubber _____cc__ 100
Foaming agent, egg alubumin_____cc__ 2.5
Plasticizer, 30–1 _____cc__ 2.5
Activator, zinc oxide _____cc__ 2.0
Sensitizer, a 25% dispersion of sodium silico-
 fluoride _____cc__ 1.0

III

Natural latex, an aqueous dispersion of natural
 rubber _____cc__ 50
Neoprene latex, 140–22087 _____cc__ 50
Plasticizer, 30–1 _____cc__ .1
Sensitizer, a 25% dispersion of sodium silico-
 fluoride _____cc__ 2.3

It may also be noted that the usual fabric covering that is employed for cushions and the like has a number of small fibers projecting therefrom and one important characteristic of my invention is that the foam rubber composition is intimately bonded to the fabric after the rubber foam is cured. Where fabrics are to be used that do not have a sufficient number of fibers projecting therefrom to give a good bonding of the foam thereto, a backing layer of another fabric can be applied between the fabric covering and the foam rubber and thereby act as a bonding agent.

It will be understood that this invention is susceptible to modification in order to adapt it to different usages and conditions, and, accordingly, it is desired to comprehend such modifications within this invention as may fall within the scope of the appended claims.

I claim:

1. A method of manufacturing a sponge rubber seat cushion having a body of sponge rubber, comprising shaping a fabric envelope to define the configuration of the cushion, supporting the configuration in a mold cavity having walls which are transparent to infra-red rays, closing the mold, introducing into the mold and into the envelope a mass of uncured rubber latex and foaming gas under pressure to thereby fill the mold cavity with foamed rubber, initially heating the resultant filled mold by infra-red radiation to cause the foamed rubber mass to set up quickly and partly solidify to preserve the random pattern of the bubbles of gas throughout the foamed mass and prevent migration of the gas bubbles, and thereafter subjecting the resultant molds containing the partially cured foamed rubber mass to a temperature of approximately 250° F. for a period of two hours.

2. A method of manufacturing a sponge rubber seat cushion having a body of sponge rubber, comprising shaping a fabric envelope to define the configuration of the cushion, supporting the configuration in a mold cavity having walls which are transparent to infra-red rays, closing the mold, introducing into the mold and into the envelope a mass of uncured rubber latex and foaming gas under pressure to thereby fill the mold cavity with foamed rubber, impregnating said fabric envelope with said mass of rubber latex and foaming gas to initially bond said fabric with the rubber latex mass, then heating the resultant filled mold by infra-red radiation to cause the foamed rubber mass to set up quickly and partly solidify to preserve the random pattern of the bubbles of gas throughout the foamed mass and prevent migration of the gas bubbles, and thereafter subjecting the resultant molds containing the partially cured foamed rubber mass to a temperature of approximately 250° F. for a period of two hours.

References Cited in the file of this patent

UNITED STATES PATENTS

| | | |
|---|---|---|
| 1,534,361 | Carig | Apr. 21, 1925 |
| 1,597,803 | Kearney | Aug. 31, 1926 |
| 1,602,172 | Ruby | Oct. 5, 1926 |
| 1,610,286 | Hood et al. | Dec. 14, 1926 |
| 1,645,604 | Lower | Oct. 18, 1927 |
| 1,725,479 | Rissmann | Aug. 20, 1929 |
| 1,905,269 | Denton | Apr. 25, 1933 |
| 1,978,343 | Davies et al. | Oct. 23, 1934 |
| 2,014,468 | Clayton | Sept. 17, 1935 |
| 2,027,165 | Grubman | Jan. 7, 1936 |
| 2,063,081 | Church | Dec. 8, 1936 |
| 2,156,508 | Minor | May 2, 1939 |
| 2,217,137 | Roth et al. | Oct. 8, 1940 |
| 2,200,262 | Daley | May 14, 1940 |
| 2,231,346 | Riesing et al. | Feb. 11, 1941 |
| 2,232,109 | Gibbons | Feb. 18, 1941 |
| 2,318,203 | Crosby | May 4, 1943 |
| 2,359,009 | Sawyer | Sept. 26, 1944 |
| 2,449,500 | Nordmark | Sept. 14, 1948 |
| 2,514,214 | Flint | July 4, 1950 |
| 2,567,952 | Lewis | Sept. 18, 1951 |
| 2,574,391 | Herrly | Nov. 6, 1951 |
| 2,586,275 | Toulmin | Feb. 19, 1952 |